United States Patent
D'Hooge

(10) Patent No.: US 6,433,774 B1
(45) Date of Patent: Aug. 13, 2002

(54) VIRTUALIZATION OF INTERACTIVE COMPUTER INPUT

(75) Inventor: Herman D. D'Hooge, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/205,895

(22) Filed: Dec. 4, 1998

(51) Int. Cl.⁷ .................................................. G09G 5/08
(52) U.S. Cl. ...................................... 345/157; 345/764
(58) Field of Search ................................ 345/330, 331, 345/334, 349, 348, 973, 968, 962, 753, 751, 765, 839, 835, 786, 764, 171, 173, 113, 419, 156, 157

(56) References Cited

U.S. PATENT DOCUMENTS

| | | | | |
|---|---|---|---|---|
| 5,767,842 A | * | 6/1998 | Korth | 345/168 |
| 5,793,367 A | * | 8/1998 | Taguchi | 345/330 |
| 5,936,614 A | * | 8/1999 | An et al. | 345/173 |
| 6,104,384 A | * | 8/2000 | Moon et al. | 345/354 |
| 6,121,960 A | * | 9/2000 | Carroll et al. | 345/173 |
| 6,134,547 A | * | 10/2000 | Huxley et al. | 707/5 |
| 6,137,485 A | * | 10/2000 | Kawai et al. | 345/327 |
| 6,227,974 B1 | * | 5/2001 | Eilat et al. | 345/419 |

* cited by examiner

*Primary Examiner*—Cao H. Nguyen
(74) *Attorney, Agent, or Firm*—Schwegman, Lundberg, Woessner & Kluthm P.A.

(57) ABSTRACT

Methods of providing user input to an interactive computer application using video input in association with touch input. The methods include generating a control view having a control image, wherein the control image is associated with an application command; generating a foreground view of a controlling entity superimposed on the control view, wherein an image location of the foreground view within the control view is indicative of a physical location of the controlling entity adjacent a touch input device; and producing an output capable of selecting the application command when the touch input device is activated by the controlling entity at the physical location where the foreground view is aligned with the control image. Machine-readable medium having instruction stored thereon capable of causing a processor to carry out the methods of providing user input. Apparatus adapted to carry out the methods of providing user input.

32 Claims, 8 Drawing Sheets

VIRTUALIZATION OF INTERACTIVE COMPUTER INPUT

TECHNICAL FIELD OF THE INVENTION

The invention relates generally to accepting and interpreting user input to an interactive software application, and more specifically to using video input in combination with touch input in interactive applications, wherein the touch input is guided by graphic feedback.

BACKGROUND OF THE INVENTION

Computer games have grown in complexity as the computer hardware on which they run advance in speed and capability. Expectations for realism have likewise become more critical as users are exposed to increasingly complex play. Unfortunately, the interfaces between the computer user and the computer game are lagging behind these expectations.

The limited abilities of the "mouse" or other pointing device make them unsuitable for control of typical games. Although some application-specific hardware is available, such as joysticks or steering wheels typically found in flight or automotive simulations, garners are often required to supplement the functions of this application-specific hardware with input from a keyboard.

As most garners are aware, finding the correct key or keys on a keyboard during the "heat of battle" can be a difficult task at best. Add to this the often difficult task of trying to remember the correlation between the desired function and the required key. While most games provide a table or template to assist the gamer, there is often not sufficient time to consult either device in time to avoid adverse consequences in the game.

As will be seen from the above concerns, there exists a need for an improved interface between a computer user and interactive computer software. The above mentioned problems with user input to interactive applications and other problems are addressed by the present invention and will be understood by reading and studying the following specification.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is, therefore, not to be taken in a limiting sense, and the scope of the invention is defined by the appended claims. Like numbers in the figures refer to like components, which should be apparent from the context of use.

As used herein, the term touch input device includes keyboards, keypads or other pressure-activated devices capable of providing an output indicative of position of activation. The term touch input device as used herein further includes video input devices in combination with image processing software capable of detecting a key-press equivalent action in response to some movement of the user. The term video input device includes charge-coupled device (CCD) cameras, silicon sensors and other input devices capable of generating a computer-readable image.

Figure 1A:
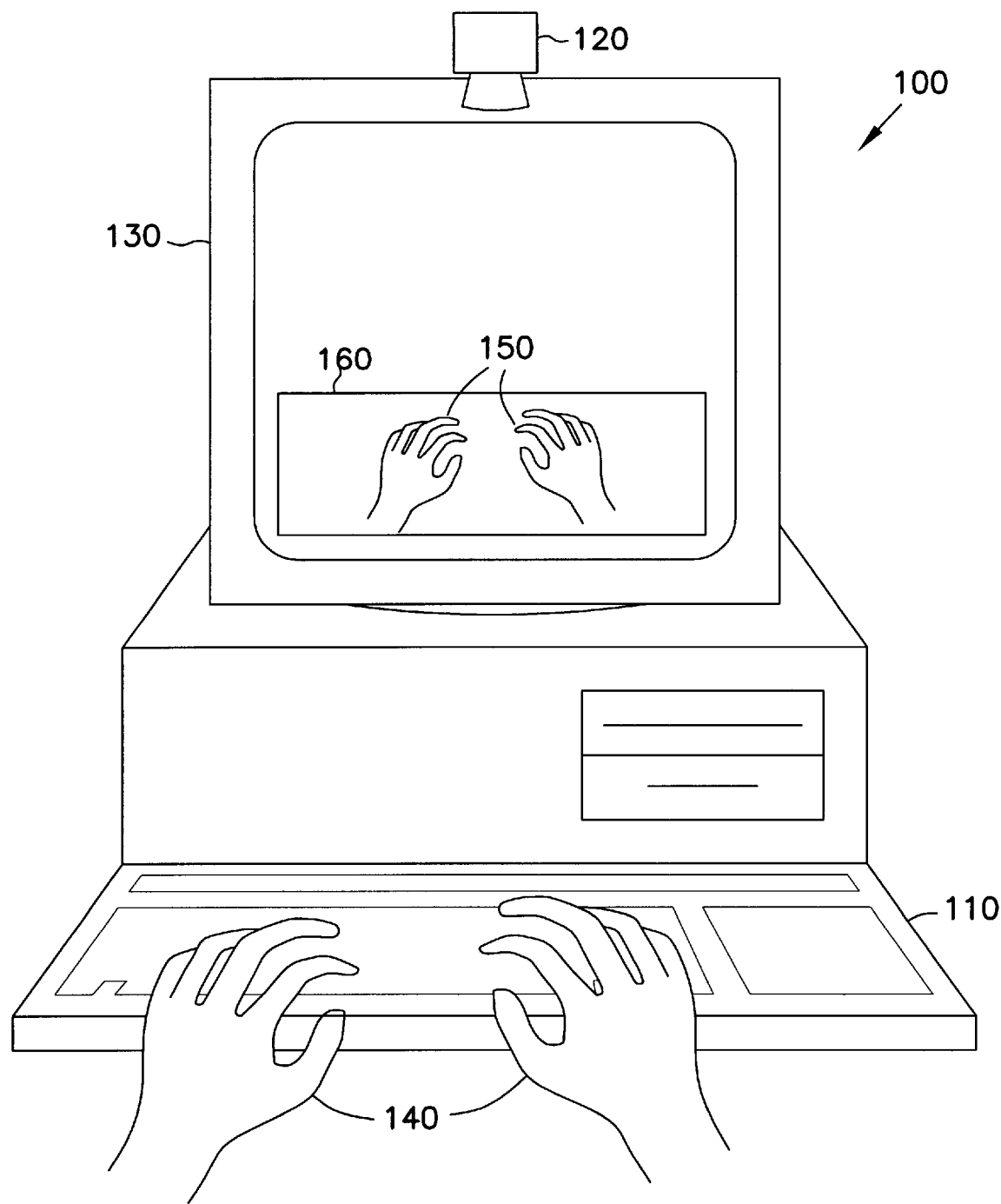
FIG. 1A illustrates a computer system for accepting video and touch input in combination.

FIG. 1A depicts a computer system 100 incorporating the invention. Computer system 100 contains a keyboard 110 as a touch input device and a CCD video camera 120 as a video input device. Computer system 100 further contains a graphic display, or monitor 130. During operation, the monitor 130 displays a control view 160 and a foreground view 150. Foreground view 150 is either displayed in the foreground or translucently on the control view. Such translucent display may be accomplished using a variety of image mixing techniques, including temporal multiplexing, spatial multiplexing and color averaging. Foreground view 150 represents an image of a controlling entity 140, where the controlling entity 140 is adjacent the keyboard 110. The controlling entity is represented by a user's hands 140 adjacent keyboard 110. A user's hands are not the only controlling entities available. Alternatively, the foreground view 150 may represent an image of a user's feet for input to an automotive or flight simulation application. Additionally, the controlling entity may be a pointer, a puck or any other object selectively positionable by the user.

The location of foreground view 150 within control view 160 is indicative of the physical location of hands 140 adjacent keyboard 110. Foreground view 150 thus provides graphic feedback to the user to indicate the position of hands 140 adjacent keyboard 110 such that the user is freed from the task of looking at keyboard 110 to determine when or where to press a key.

Control view 160 may occupy only a portion of monitor 130, as shown. The position of control view 160 within monitor 130 is not critical such that control view 160 may occupy any portion of monitor 130. Control view 160 may further occupy more than one portion of monitor 130, e.g., a first portion associated with input from a first hand 140 and a second portion associated with input from a second hand 140.

Furthermore, control view 160 may occupy any amount of monitor 130 including the full available image area. Control view 160 and foreground view 150 may be displayed in the image foreground such that they obscure all other graphics in the portion of graphics display 130 occupied by control view 160. Alternatively, control view 160 and foreground view 150 may be displayed translucently such that additional application graphics are visible through control view 160 and foreground view 150.

Figure 1B:
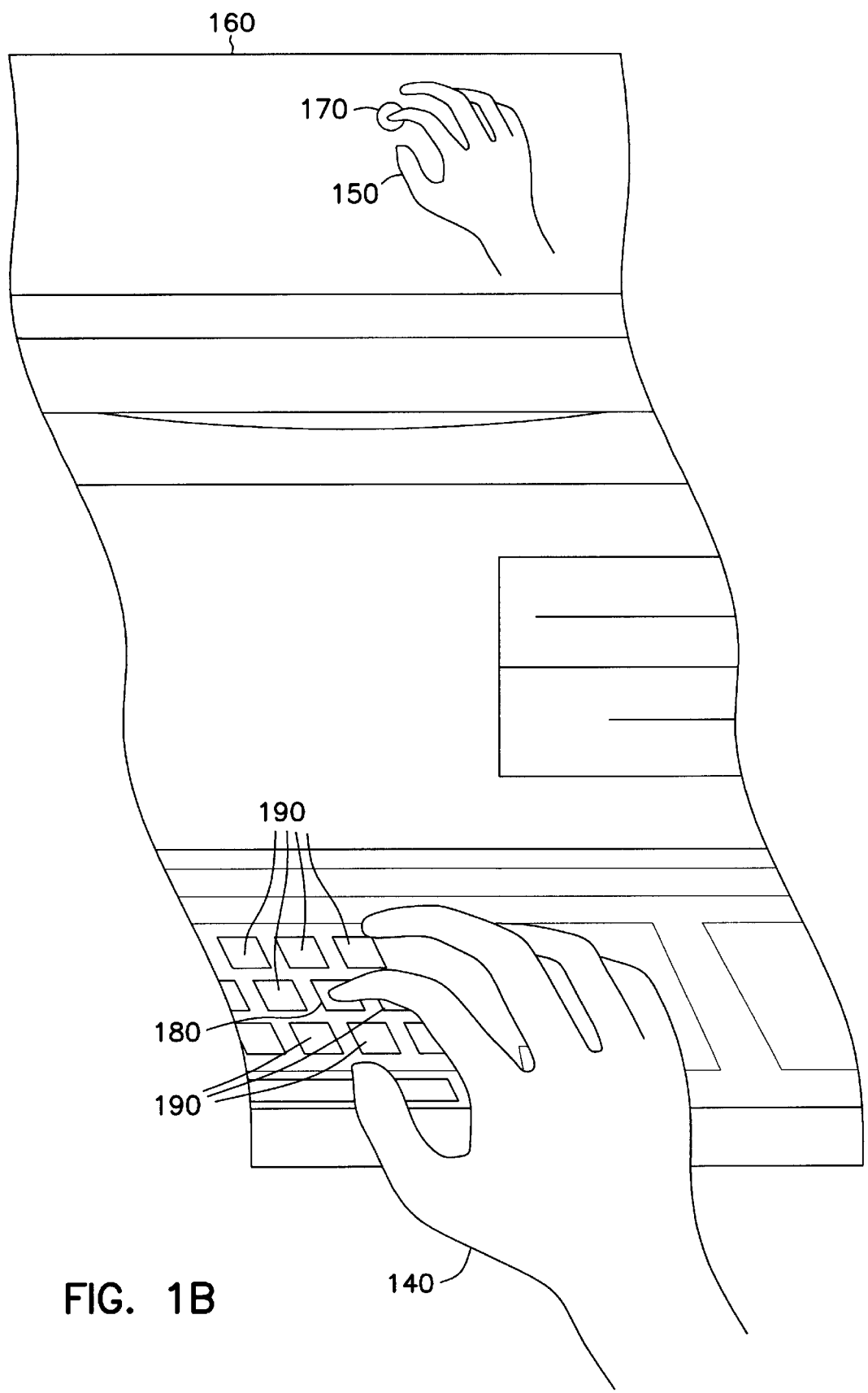
FIG. 1B is an exploded view of a portion of the computer system of FIG. 1A with one embodiment of a foreground view.

FIG. 1B is an exploded view of computer system 100 showing detail of control view 160 having a control image 170, and keyboard 110 having a key 180 and surrounding keys 190. Control image 170 is depicted as a circle or button. However, control image 170 can take any shape or appearance as defined by the interactive application and the imagination of application designers.

Control image 170 is associated with an application command of the interactive application. The application command may be an on/off function; a select/deselect function; an increment/decrement function; a directional function; a character input; or any other interactive function adaptable to a key-press equivalent.

As depicted in FIG. 1B, hand 140 adjacent keyboard 110 results in foreground view 150. Alignment of foreground view 150 with control image 170 brings hand 140 to a physical location adjacent key 180. Pressing down on key 180 by hand 140 activates keyboard 110 at the physical location, and produces an output capable of selecting an application command associated with control image 170. It is thus the graphic feedback of foreground view 150 that guides the user to select the desired application command associated with control image 170 without the need for direct viewing of keyboard 110.

In a further embodiment, aligning the foreground view 150 with control image 170 may not bring hand 140 adjacent the desired key 180 that is associated with the same application command as control image 170. Such misalignment may be due to a number of factors, e.g., image drift, resolution capabilities of camera 120, movement of camera 120, movement of keyboard 110 or more. Minor misalignment can be overcome by mapping a cluster of keys to an application command rather than a single key. In one embodiment, the cluster may include desired key 180 and all surrounding keys 190.

Figure 1C:
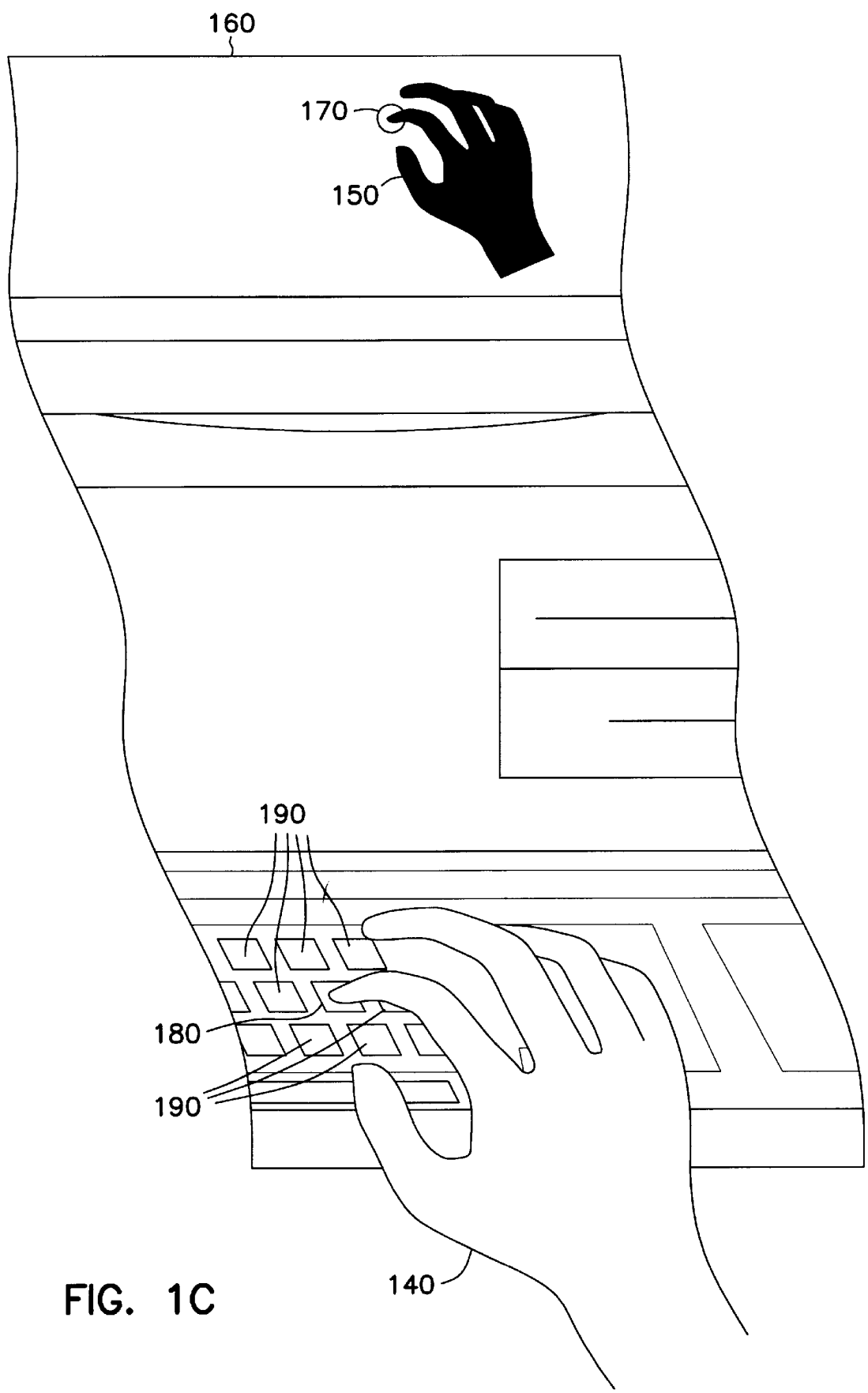
FIG. 1C is an exploded view of a portion of the computer system of FIG. 1A with another embodiment of a foreground view.
Figure 1D:
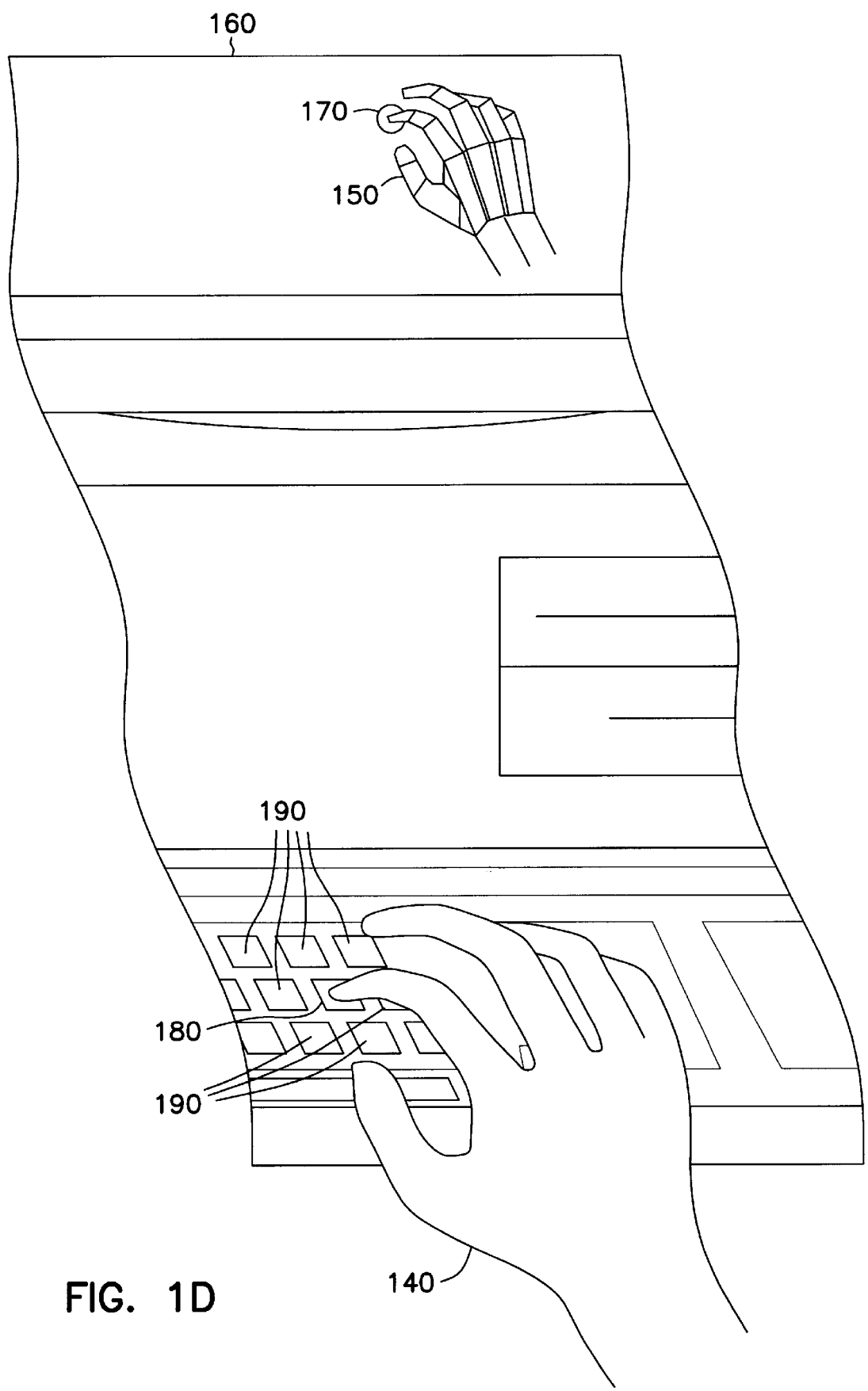
FIG. 1D is an exploded view of a portion of the computer system of FIG. 1A with a further embodiment of a foreground view.

While foreground view 150 has been previously depicted as an image substantially similar to controlling entity 140, foreground view 150 is not so limited. The image of controlling entity 140 may be modified, enhanced or otherwise substituted during the generation of foreground view 150 to augment the setting or mood of the computer application. FIG. 1C shows one example of foreground view 150 containing such an alternative representation of the controlling entity 140. In FIG. 1C, foreground view 150 is shown as a silhouette of controlling entity 140. FIG. 1D shows another example of foreground view 150 containing an alternative representation of the controlling entity 140. In FIG. 1D, foreground view 150 is shown as a mechanized or robotic hand. Modification, enhancement and substitution of the image of controlling entity 140 in foreground view 150 is well within the ordinary skill in the art.

Figure 2:
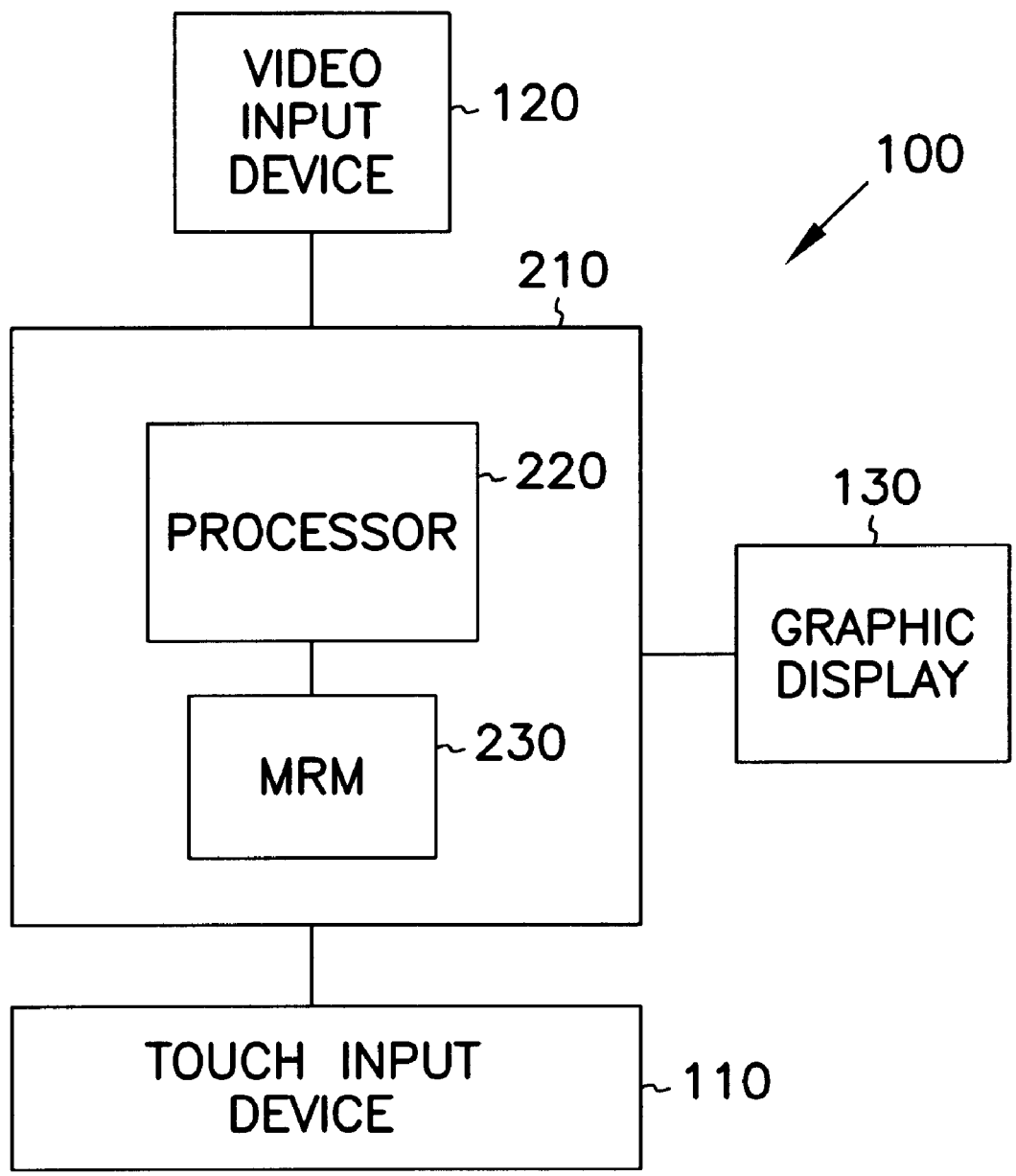
FIG. 2 is a block diagram of the computer system of FIG. 1A.

FIG. 2 is a block diagram of computer system 100. As shown in FIG. 2, computer system 100 includes a computer 210 in combination with keyboard 110, camera 120 and monitor 130. Computer 210 includes processor 220 in communication with machine-readable medium 230. Machine-readable medium 230 has instructions stored thereon capable of causing processor 220 to carry out the methods as described herein. Machine-readable medium 230 may be a memory incorporated into processor 220 or other storage medium otherwise associated with computer 210. Machine-readable medium 230 may further be a medium removable from computer 210, such as a floppy disk or a CD-ROM, for distribution and installation and execution on another (suitably equipped) computer.

Figure 3:
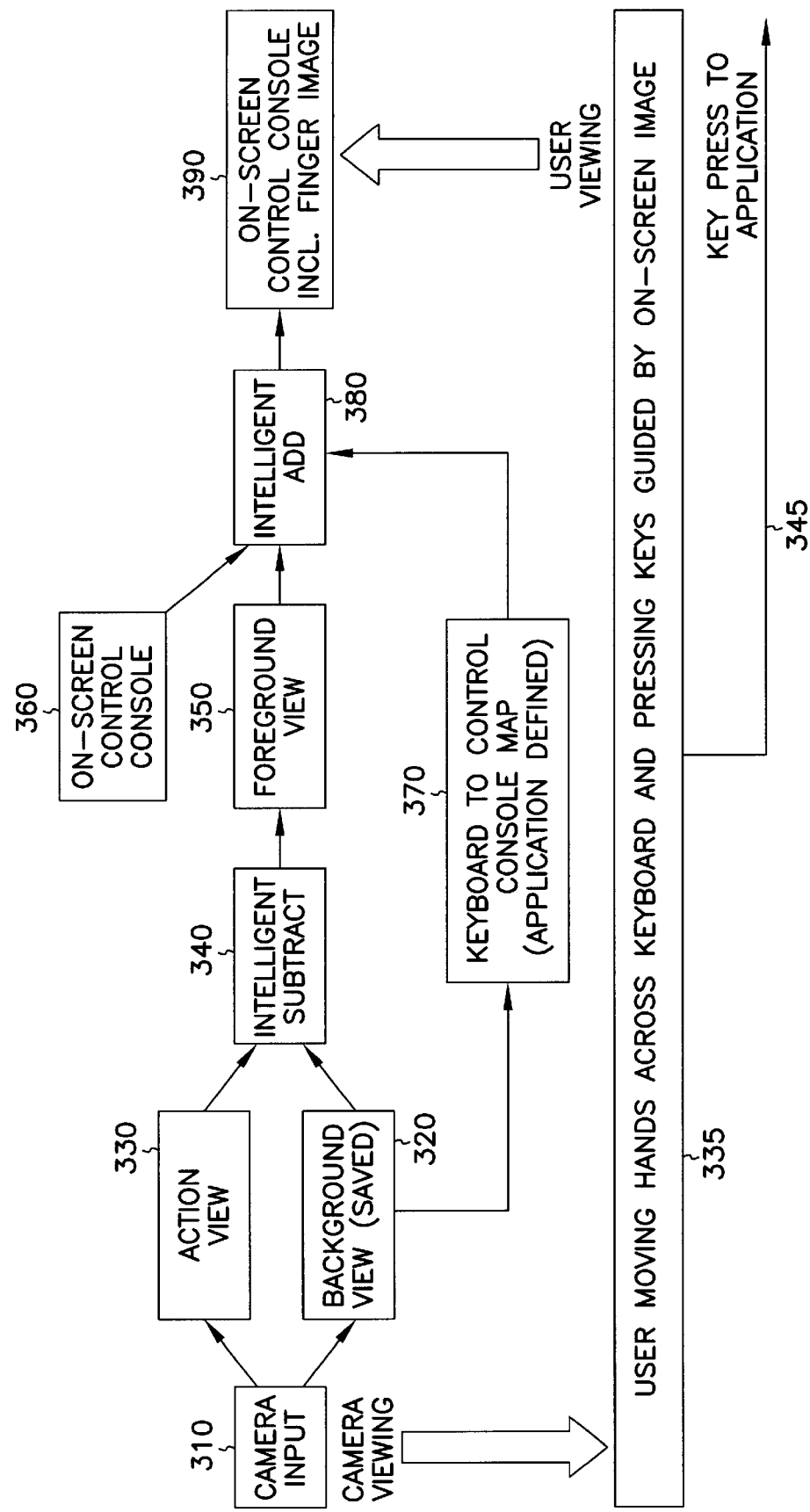
FIG. 3 is a block diagram illustrating the parallel processing of video and touch input.

FIG. 3 illustrates the parallel activities occurring during user interaction with computer system 100. These parallel activities are generally continuous during user interaction with an application. At block 310, camera 120 accepts input. Input from block 310 is stored as a background view at block 320. The background view represents a view of the keyboard 110 without the hands 140. Storing the background view at block 320 is generally done only once prior to user interaction. However, it is within the scope of the invention to periodically accept camera input at block 310 for updates to the background view to correct for movement of keyboard 110. Such correction may involve alignment of landmarks on keyboard 110, e.g., specific indicia contained on keyboard 110, and can thus avoid requiring the user to remove hands 140 from the field of vision of camera 120.

At block 330, input from block 310 is used to generate an action view representing the hands 140 adjacent the keyboard 110. The action view is dynamic in response to the changing image resulting from the user moving hands 140 across keyboard 110 at block 335. At block 340, the background view is intelligently subtracted from the action view. This operation results in generation of foreground view 150 at block 350. Intelligent subtraction is well known in the art and most people have seen the effect utilized when watching a meteorologist point to a weather map on television, or in other television or motion picture special effects. If the image of hands 140 is to be substituted or otherwise altered in the generation of foreground view 150, such substitution or alteration is appropriate following the intelligent subtraction, with a mapping of the desired image made to the image resulting from the intelligent subtraction in a manner known in the art.

An on-screen control view 160 is provided by the application at block 360 which is intelligently added to foreground view 150 at block 380. The intelligent add may place foreground view 150 in the image foreground such that control view 160 is entirely obscured by foreground view 150. Alternatively, the intelligent add may place foreground view 150 on control view 160 translucently such that control view 160 is visible through foreground view 150.

At block 370, a keyboard to control mapping is defined by the application. This mapping may be static throughout user interaction with the application, or it may by varied by the application during interaction.

At block 390, control view 160 and foreground view 150 are displayed on graphics display 130 for user viewing. Upon aligning the foreground view 150 with a control image 170 at block 390, the user presses a key 180. Activation of key 180 is output to the application at block 345.

Additional detail can be obtained with reference to FIGS. 4A through 4D. It should be noted that the processes of FIGS. 4A through 4D are generally occurring concurrently. Thus, the order in which these processes are discussed does not represent an absolute processing order and such a limiting construction shall not be presumed. Furthermore, it will be apparent to those skilled in the art that the order of many of the subprocesses also is not critical, and represents but one exemplary embodiment.

Figure 4A:
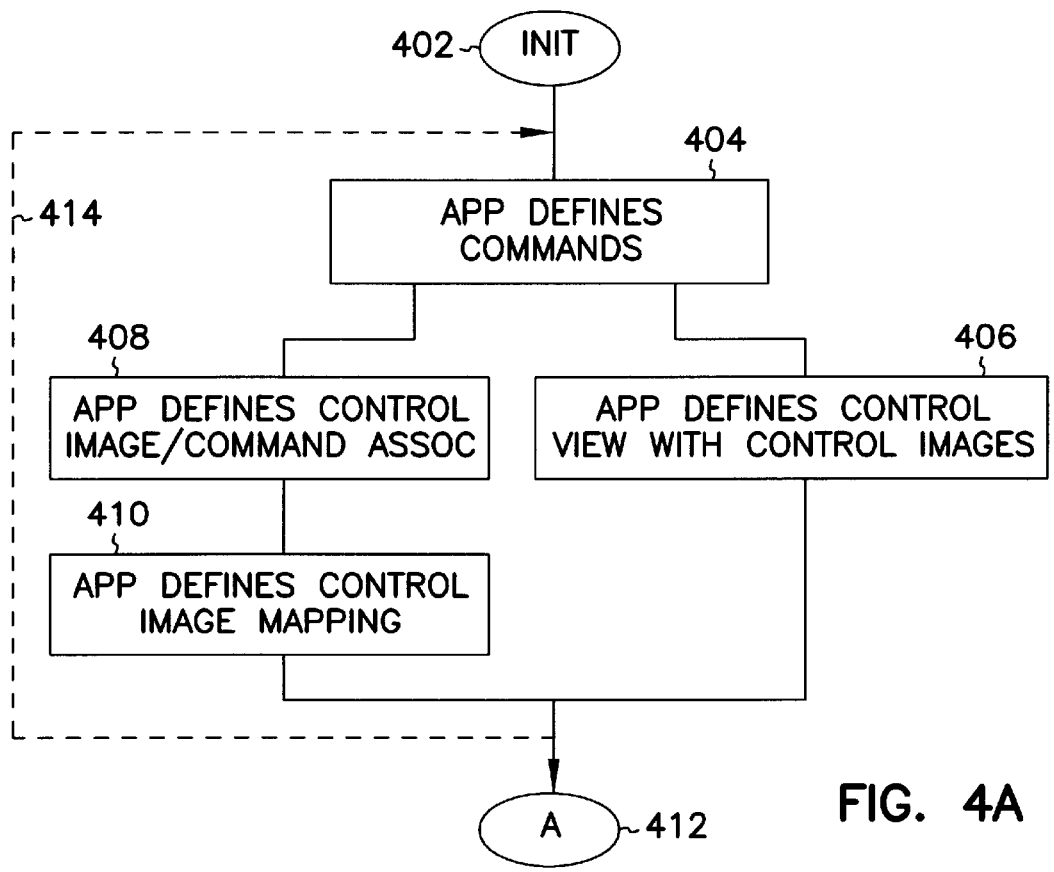
FIG. 4A is a flowchart illustrating a method of defining a control image.

The process of FIG. 4A is initialized at 402. An interactive application defines commands at 404. The interactive application may be an interactive game, a word processing application, a graphic presentation application, an industrial control application, or any other computer application requiring user input. At 408, the interactive application associates the application commands with control images, wherein each control image is associated with only one application command. Note that an application command may be associated with more than one control image.

The interactive application additionally defines a mapping of the control images at 410. This mapping allows association of keys on keyboard 110 with application commands as described with reference to FIG. 4B. The application defines a control view containing control images at 406. Output from the control view definition and mapping is transferred to other processing at branch 412. The dashed line 414 represents that the processing of FIG. 4A may be repeatable in response to changing requirements of the interactive application requiring new control images, associations and mappings.

Figure 4B:
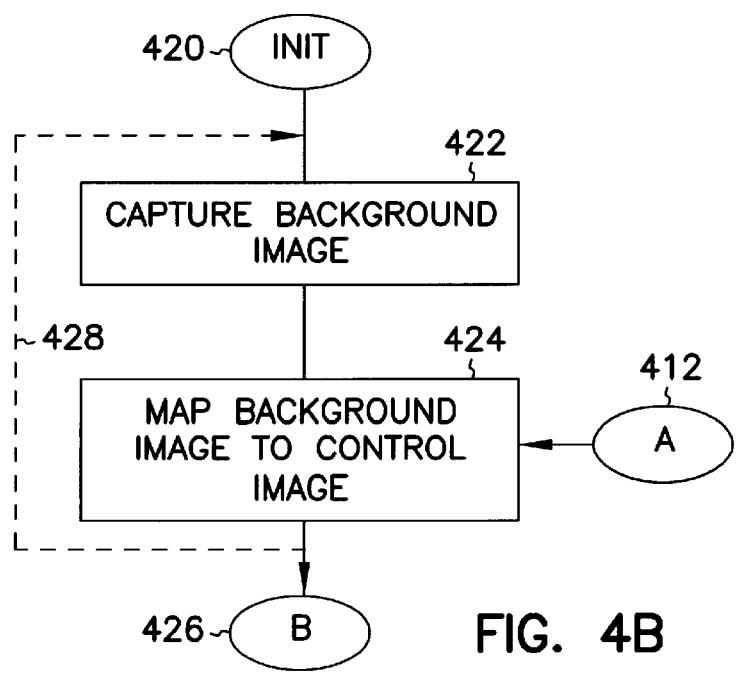
FIG. 4B is a flowchart illustrating a method of defining a background view.

The process of FIG. 4B is initialized at 420. The background view is captured at 422. The background view is mapped to control images in response to input at branch 412 such that a foreground view aligned with a control image will result when the user generating the foreground view is adjacent the key associated with the same application command as the control image. Output from the background view capture and mapping is transferred to other processing at branch 426. The dashed line 428 represents that the processing of FIG. 4B may be repeatable in response to changing requirements of the interactive application.

Figure 4C:
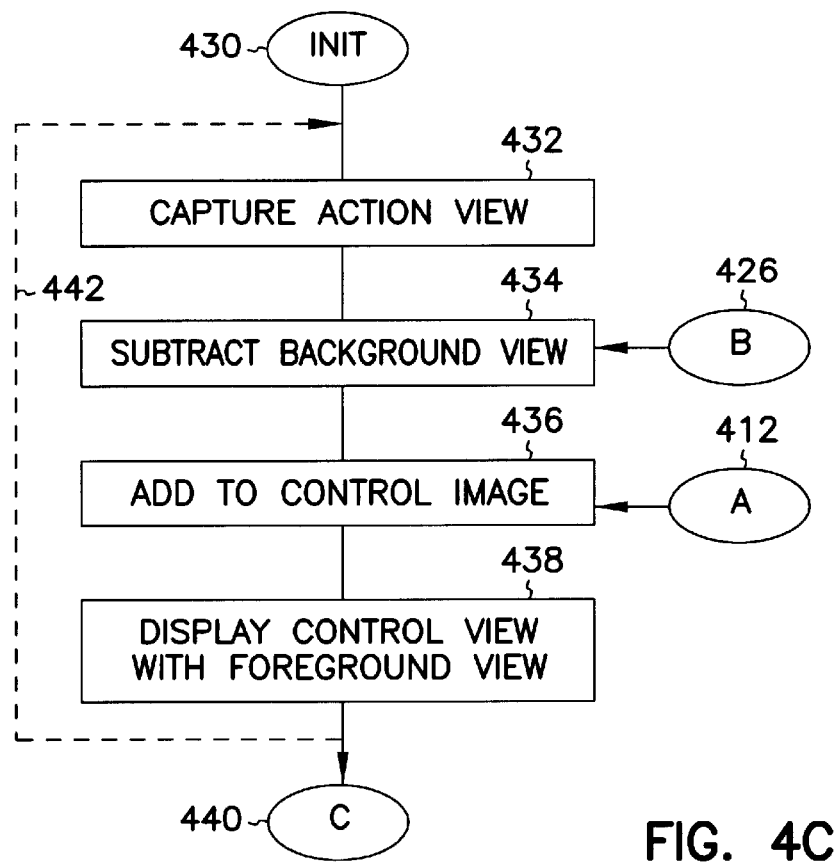
FIG. 4C is a flowchart illustrating a method of defining a foreground view.

The process of FIG. 4C initializes at 430. The action view is captured at 432. The background view from branch 426 is subtracted from the action view at 434 to produce the foreground view. The control view from branch 412 is added to the foreground view at 436. The combined foreground view and control views is displayed to the user at 438. Control is transferred to other processing at 440. The dashed line 442 represents that the processing of FIG. 4C is generally continuous to track user movement.

Figure 4D:
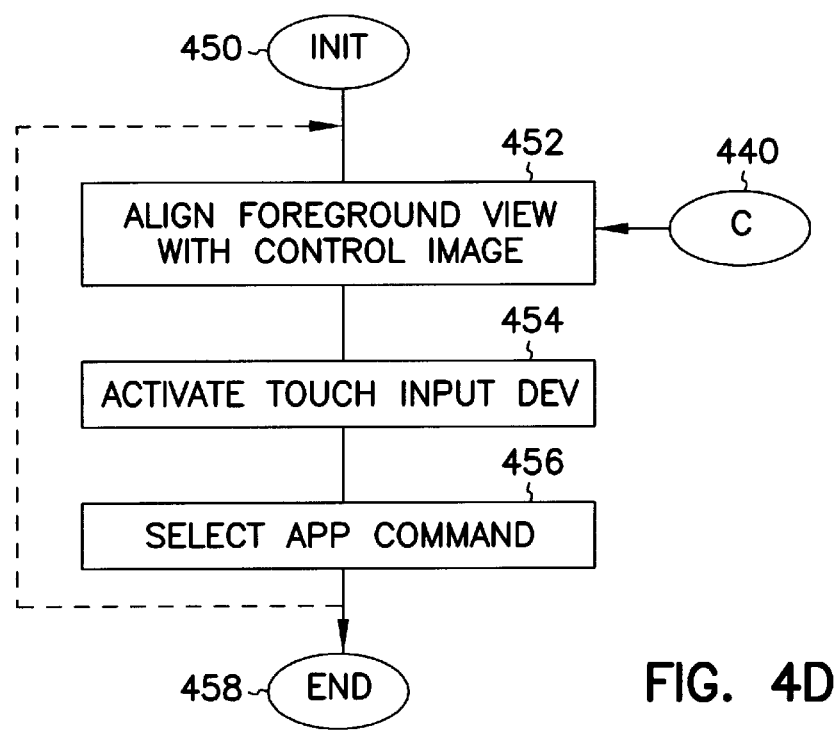
FIG. 4D is a flowchart illustrating a method of selecting an application command in response to a touch input device as guided by a graphic display.

The process of FIG. 4D initializes at 450. The user display from 440 is used to guide the user to align the foreground view with a command image at 452. Once the user has aligned the foreground view with the desired command image, the user activates the touch input device at 454. Activation of the touch input device causes selection of the application command associated with the command image aligned with the foreground view. At this point, the processing may end at 458 or may be repeated, as shown by dashed line 460, for additional user interaction.

Although specific embodiments have been illustrated and described herein, it will be appreciated by those of ordinary skill in the art that any arrangement which is calculated to achieve the same purpose may be substituted for the specific embodiments shown. Many adaptations of the invention will be apparent to those of ordinary skill in the art.

For example, by providing multiple sets of video input and touch input devices, additional avenues of input can be created. Visualize a virtual trap set, having a bass drum, a snare, a tom-tom, a hi-hat cymbal and a ride cymbal. The bass drum is operated by a foot pedal. The snare, tom-tom and ride cymbal are operated by striking them with a drum stick. The hi-hat cymbal is operated by a combination of operating a foot pedal and striking it with a stick. A first set of video input and touch input devices could provide the foot pedal input, using the user's feet as the controlling entities. A second set of video input and touch input devices could provide the drum stick input, using either the user's hands or a set of drum sticks as the controlling entities.

Accordingly, this application is intended to cover any adaptations or variations of the invention. It is manifestly intended that this invention be limited only by the following claims and equivalents thereof.

What is claimed is:

1. A system for providing input from a physical controlling entity positionable by a user to an application executing on the system, comprising:
    a physical input device to produce commands to the application program when actuated by the physical entity;
    a video input device to capture at least one image of the physical input device and to capture an action video image of the physical entity;
    a monitor to display to the user a control view including the action image of the physical entity superimposed upon an image of a virtual representation of at least one of the commands at locations determined by the physical location of the input device;
    a processor to generate the virtual representation of the command, and to produce the action image at a location in the control view determined by the physical entity's position with respect to the physical input device.

2. The system of claim 1 where the control view does not include an image of the physical input device.

3. The system of claim 1 where the physical entity is a hand or a foot of the user.

4. The system of claim 1 where the processor alters the image of the physical entity before presentation in the control view.

5. The system of claim 4 where the image of the physical entity is transformed to an alternative representation of the member of the user.

6. The system of claim 1 where the monitor also displays graphics from the application.

7. The system of claim 1 where the physical input device is a keyboard having a plurality of keys that the user can actuate via the physical entity.

8. The system of claim 7 where the virtual representation is aligned with a particular one of the keys.

9. The system of claim 7 where the keyboard produces the one command when the physical entity actuates the particular one of the keys.

10. The system of claim 1 where the system further comprises a machine-readable storage medium holding instructions and data to generate the virtual representation of the command, and to produce the image of the physical entity at a location in the control view determined by the entity's physical position with respect to the physical input device.

11. The system of claim 10 where the machine-readable medium comprises a memory incorporated into the processor.

12. The system of claim 10 where the machine-readable medium comprises a removable medium.

13. A method of providing input to an interactive application from a physical entity whose position with respect to a physical input device is controlled by a user, comprising:
    capturing at least one image of the physical input device;
    capturing an action image of the physical entity as it is being controlled by the user;
    generating a virtual representation of a particular command for the application;
    displaying both the virtual representation of the command and the action image of the entity in a control view at locations determined by their respective positions relative to the physical input device;
    producing the particular command when the user causes the entity to actuate the input device at a physical location on the device such that the image of the physical entity is aligned with the virtual representation of that command in the control view.

14. The method of claim 13 where the control view does not include an image of the physical input device.

15. The method of claim 14 further comprising subtracting the image of the physical input device from the captured action image of the member of the user.

16. The method of claim 13 where the physical entity includes a hand or a foot of the user.

17. The method of claim 13 further comprising altering the action image of the physical entity before displaying it.

18. The method of claim 13 further comprising displaying graphics from the interactive application on the same monitor as the control view.

19. The method of claim 18 where the control view is displayed translucently over at least a portion of the graphics.

20. The method of claim 13 where the application is a game, a word processor, a graphic presentation, or an industrial control application.

21. The method of claim 13 where the physical input device is a touch input device.

22. The method of claim 21 where the input device is a keyboard, one of whose keys produces the command when actuated by the user via the physical entity.

23. A machine-readable medium bearing instructions for causing a digital processor to carry out the method of claim 13.

24. A method of providing a command to an application from a physical touch input device actuated by a hand and/or foot of a user, comprising:

capturing at least one background image of the physical touch input device;

capturing a foreground action image of the location of the hand and/or foot during motion caused by the user;

generating a virtual representation of the command for the computer as a control image;

displaying on a monitor both the control image of the command and the action image of the hand and/or foot of the user in a control view at locations determined by their respective positions relative to the physical input device, the background image of the physical input device itself being absent from the control view;

displaying graphics from the application on the monitor;

producing the command when the hand and/or foot of the user actuates the touch input device at a physical location on the input device such that the image of the hand and/or foot is aligned with the virtual representation of the command in the control view.

25. The method of claim 24 where the touch input device is a physical keyboard having a plurality of keys.

26. The method of claim 25 where the virtual representation is associated with one of the keys.

27. The method of claim 26 where the command is produced when the hand of the user presses the one key on the physical keyboard.

28. The method of claim 24 where the control view at least partially overlaps the graphics from the application.

29. The method of claim 28 where the control view is translucent.

30. The method of claim 24 where the background image of the physical input device is captured more than once.

31. The method of claim 24 where the background image of the physical device and the foreground image of the hand and/or foot are captured together, and the background image is subtracted from the foreground image before the displaying operation.

32. A machine-readable medium bearing instructions for causing a digital processor to carry out the method of claim 24.

* * * * *

UNITED STATES PATENT AND TRADEMARK OFFICE
CERTIFICATE OF CORRECTION

PATENT NO. : 6,433,774 B1
DATED : August 13, 2002
INVENTOR(S) : Herman D. D'Hooge It is certified that error appears in the above-identified patent and that said Letters Patent is hereby corrected as shown below:

<u>Title page,</u>
Item [74], "*Attorney*", delete "Kluthm" and insert -- Kluth, --, therefor.

Signed and Sealed this

Twenty-eighth Day of January, 2003

JAMES E. ROGAN
*Director of the United States Patent and Trademark Office*